(12) United States Patent
Kawamura (10) Patent No.: US 7,496,378 B2
(45) Date of Patent: Feb. 24, 2009

(54) PORTABLE INFORMATION TERMINAL COMPRISING A CAMERA WITH A FIXED AND MOVABLE DISPLAY

(75) Inventor: Kenji Kawamura, Tokyo (JP)

(73) Assignee: NEC Corporation, Tokyo (JP)

( * ) Notice: Subject to any disclaimer, the term of this patent is extended or adjusted under 35 U.S.C. 154(b) by 321 days.

(21) Appl. No.: 10/367,880

(22) Filed: Feb. 19, 2003

(65) Prior Publication Data

US 2004/0198458 A1 Oct. 7, 2004

(30) Foreign Application Priority Data

Feb. 18, 2002 (JP) ............................. 2002-040190

(51) Int. Cl.
*H04M 1/02* (2006.01)
(52) U.S. Cl. .................. 455/556.1; 455/566; 455/575.8
(58) Field of Classification Search ................. 455/566, 455/556.1, 556.2, 575.3, 575.4, 416, 66.1, 455/550.1, 557, 569.1, 575.1, 575.8; 348/14.07; 379/433.04, 434, 93.21
See application file for complete search history.

(56) References Cited

U.S. PATENT DOCUMENTS

| | | | | |
|---|---|---|---|---|
| 5,491,507 | A * | 2/1996 | Umezawa et al. ........ | 348/14.02 |
| 5,901,223 | A | 5/1999 | Wicks et al. | |
| 6,222,507 | B1 * | 4/2001 | Gouko ........................ | 345/1.1 |
| 6,297,945 | B1 * | 10/2001 | Yamamoto .................. | 361/681 |
| 6,327,482 | B1 * | 12/2001 | Miyashita ................... | 455/566 |
| 6,424,369 | B1 * | 7/2002 | Adair et al. ................. | 348/76 |
| 6,510,325 | B1 * | 1/2003 | Mack et al. ............... | 455/575.2 |
| 6,643,124 | B1 * | 11/2003 | Wilk .......................... | 361/681 |
| 6,751,473 | B1 * | 6/2004 | Goyal et al. ............. | 455/556.1 |
| 6,788,960 | B2 * | 9/2004 | Masutani et al. .......... | 455/556.1 |
| 6,795,715 | B1 * | 9/2004 | Kubo et al. .............. | 455/556.1 |
| 6,876,379 | B1 * | 4/2005 | Fisher ..................... | 348/14.02 |
| 6,904,298 | B2 * | 6/2005 | Arai et al. ................ | 455/556.1 |
| 6,996,424 | B2 * | 2/2006 | Ijas et al. .................. | 455/575.1 |
| 7,003,266 | B2 * | 2/2006 | Bestle ....................... | 455/90.3 |

(Continued)

FOREIGN PATENT DOCUMENTS

EP 1 037 132 A2 9/2000

(Continued)

*Primary Examiner*—Blane J Jackson
(74) *Attorney, Agent, or Firm*—Sughrue Mion, PLLC (57) ABSTRACT

An object of the present invention is to provide a wider display screen to a portable information terminal including a video telephone function and to provide means for simultaneously confirming both a transmission screen and a reception screen.

A movable display part in a shape of a lid body that can be opened is provided in a back of a case of the portable information terminal and the movable display part is opened taking an axis provided on the case as a center, thereby enabling a display screen of the movable display part to be seen from the same direction as that of a fixed display part. Thus, a wider display screen than the conventional one is provided. Moreover, different information is displayed on the fixed display part and the movable display part, thus increasing an amount of information that can be recognized by an operator at a time. Particularly, in using a video telephone, a transmitted image is displayed on one of the screens and a received image is displayed on the other screen. As a result, it is made possible to make a phone call while confirming an image in an actual dimension of the transmitted image, which was difficult to perform in the conventional portable information terminal.

8 Claims, 10 Drawing Sheets

U.S. PATENT DOCUMENTS

| | | | |
|---|---|---|---|
| 2002/0077069 A1* | 6/2002 | Heurtaux ..................... | 455/90 |
| 2002/0077145 A1* | 6/2002 | Kamiya et al. ............... | 455/550 |
| 2002/0142810 A1* | 10/2002 | Kawasaki et al. ........... | 455/566 |
| 2003/0013483 A1* | 1/2003 | Ausems et al. .............. | 455/556 |
| 2004/0067768 A1* | 4/2004 | King et al. ................ | 455/556.1 |
| 2004/0077386 A1* | 4/2004 | Nagasawa ................ | 455/575.1 |
| 2004/0204126 A1* | 10/2004 | Reyes et al. ................. | 455/566 |

FOREIGN PATENT DOCUMENTS

| | | | |
|---|---|---|---|
| GB | 2 337 891 A | | 12/1999 |
| JP | 11-146370 | * | 5/1997 |
| JP | 9-247250 A | | 9/1997 |
| JP | 10-65780 A | | 3/1998 |
| JP | 11-146370 | * | 5/1999 |
| JP | 11-146370 A | | 5/1999 |
| JP | 2001-136247 A | | 5/2001 |
| WO | WO 99/31649 A1 | | 6/1999 |
| WO | WO 02/30091 A1 | | 4/2002 |

* cited by examiner

(TOP PLAN VIEW)

(b)

(BACK VIEW)

(TOP PLAN VIEW)

(b)

(BACK VIEW)

(TOP PLAN VIEW)

(b)

(BACK VIEW)

(TOP PLAN VIEW)

(b)

(BACK VIEW)

PORTABLE INFORMATION TERMINAL COMPRISING A CAMERA WITH A FIXED AND MOVABLE DISPLAY

BACKGROUND OF INVENTION

1. Field of the Invention

This invention relates to a portable information terminal displaying not only an image on a screen of a fixed display part attached to a front of a case but also an image on a screen of a movable display part provided on a back of the case.

2. Related Art of the Invention

The portable information terminal is a battery-driven electronic communication device that has a battery in its body. As a general portable information terminal, a portable telephone, a PDA (personal digital assistant) and the like are cited.

In the field of portable telephones among conventional portable information terminals, there is a portable telephone in which a camera can be built or to which a camera can be attached externally. Moreover, there is also camera capable of photographing not only a still image but also a motion image. Presently, the portable telephone is highly computerized and made to have multiple functions. Thus, there is an urgent need to enlarge a display area of a screen and to improve a display efficiency.

As a well known example in the past related to a portable telephone with a video telephone function, in Japanese Patent Application Laid-open No. Hei 10-65780, disclosed is a portable telephone including a video camera and an image display part inside a body, the image display part displaying a received image and a transmitted image, in which an image to be transmitted and received is displayed on the same screen.

Moreover, as a method of enlarging a display area, in Japanese Patent Application Laid-open No. Hei 9-247250, disclosed is a portable telephone including a lid body in a shape of encasing an operating part, in which the lid body can be opened and displays a large amount of information as one color liquid crystal display composed of two screens when opened.

Furthermore, in Japanese Patent Application Laid-open No. 2001-136247, disclosed is a folding portable telephone capable of confirming reception of a mail and the like even in its folded state by attaching a display part thereto, which is exposed to the outside of the portable telephone in a state of folding a case.

In the field of portable video telephone sets among the portable information terminals, as a technique of displaying a transmitted image, in Japanese Patent Application Laid-open No. Hei 11-146370, disclosed is a technique in which a single display screen is displayed by being divided into two screens when used as a video telephone and is displayed without any division thereof when used as a digital still camera, thus making it possible to immediately understand which function the device is in.

In the above-described conventional technique (Japanese Patent Application Laid-open No. Hei 10-65780), it is disclosed that transmitted and received images are both displayed on one image display part of the portable telephone. However, a size of the image display part of the portable telephone is limited. Thus, when the single image display part is displayed by being divided, the area of the display part is reduced, thereby bringing about a possibility of exceeding a visual confirmation capability. Moreover, an actually transmitted image is processed to be reduced, and thus there is a problem that the actually transmitted image itself cannot be confirmed.

Moreover, in Japanese Patent Application Laid-open No. Hei 9-247250, liquid crystal displays are disposed on the back of the operating part and in the body. However, in this constitution, there is a problem that a major part of the liquid crystal display part of the lid body cannot contribute to display of information at all when the operation is performed while closing the lid body.

Furthermore, in the invention related to Japanese Patent Application Laid-open No. 2001-136247, the two display parts are merely in the state of being fixed to a surface of the portable telephone and to an internal surface of the folded part, respectively. Thus, an enlarged display screen cannot be formed in use of the portable telephone.

In the invention according to Japanese Patent Application Laid-open No. Hei 11-146370 related to the video telephone, the display region of the screen is fixed. Thus, similarly to the invention disclosed in Japanese Patent Application Laid-open No. Hei 10-65780, there is a problem that the actually transmitted image cannot be confirmed.

SUMMARY OF THE INVENTION

A first object of the present invention is to achieve enlargement of a display screen in use of a portable telephone while placing no limitation on an operating part and allowing a given display part to be constantly in a usable state.

A second object of the present invention is to provide a portable telephone displaying a received image and a transmitted image by utilizing the enlarged screen.

The present invention is related to a portable information terminal including a fixed display part and a movable display part in a shape of a lid body that can be opened from a back of a case, to which a display screen of the movable display part is attached so as to be viewable from the back of the case.

The portable information terminal of the present invention includes a mechanism for temporarily fixing the display screen of the movable display part after being opened and a display screen of the fixed display part at an angle capable of viewing the display screens from a given direction.

The portable information terminal of the present invention includes a mechanism for fixing the display screen of the movable display part after being opened at an arbitrary angle with respect to the display screen of the fixed display part.

The portable information terminal of the present invention includes a transmission circuit for transmitting a voice of an operator, a reception circuit for receiving a radio signal and a control unit for controlling the entire portable telephone.

The control unit allows the display screens of the fixed display part and the movable display part to display information different from each other.

The control unit allows the display screens of the fixed display part and the movable display part to display the same information.

The portable information terminal of the present invention further includes a movable display part opening and closing detecting unit for detecting opened and closed states of the movable display part.

When the movable display part is closed, the control unit allows not only the fixed display part but also the movable display part to operate.

When the movable display part is closed, the movable display part stops its display operation.

The portable information terminal of the present invention includes a protection cover for protecting the movable display part. Even in a state where the movable display part is protected by the protection cover which is entirely or partially transparent, any one of the entire display screen of the movable display part and a part thereof operates its display.

The portable information terminal of the present invention includes the protection cover of the movable display part, the protection cover protecting the display screen of the movable display part when the movable display part is closed.

The portable information terminal of the present invention includes a camera for photographing a still image and a motion image.

The portable information terminal of the present invention includes: the fixed display part, the movable display part and a display control unit for controlling the display parts; a transmission circuit and a transmission part, which allow a voice of an operator to be in a transmittable state; a reception circuit and a reception part, which play back a received content; a operating part by which the operator operates the portable telephone; a control unit including a memory; the camera and a camera control unit, which perform photographing of a still image and a motion image; and an antenna.

The portable information terminal of the present invention includes a control unit for sequentially transmitting a motion image photographed by the camera to a transmission destination simultaneously with an audio, and has a video telephone function.

The portable information terminal of the present invention includes a control unit for displaying a received image on any one of the fixed display part and the movable display part and an image to be transmitted on the other thereof in use of the video telephone.

The case can be folded.

The case is slidable.

DETAILED DESCRIPTION OF THE PREFERRED EMBODIMENTS

Next, detail description will be made for embodiments of the present invention with reference to the accompanying drawings. Note that a portable telephone is cited below as an example of a portable information processing terminal. However, the portable information processing terminal is not necessarily limited to the portable telephone, but may be an information terminal such as a PDA, a portable game machine, and a portable GPS.

Figure 1:
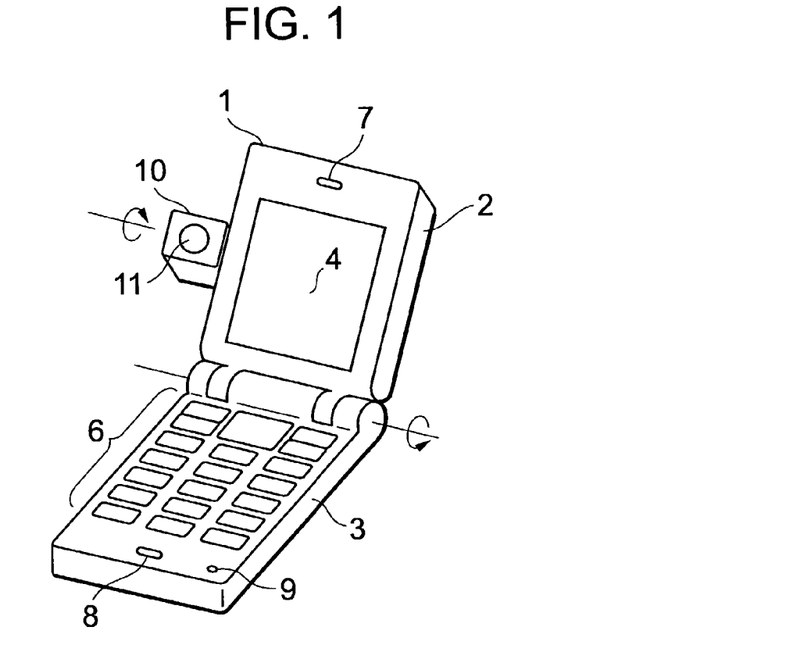
FIG. 1 is a perspective view of a folding portable information terminal when a case thereof is opened and a movable display part is closed according to the present invention.

FIG. 1 is a front perspective view of a portable telephone 1 when a user opens a case thereof for the purpose of using the portable telephone 1. The portable telephone 1 is assumed to be a folding portable information terminal and is constituted by including an upper-side case 2, a lower-side case 3, a fixed display part 4 and a hinge part 5. The hinge part 5 will be an axis when the upper-side case 2 and lower-side case 3 are opened and closed. The hinge part 5 is constituted by combining hinges together, which are included in the upper-side case 2 and lower-side case 3, respectively. Note that, when the upper-side case 2 needs to be fixed at a specific angle such as a 120-degree angle or a 180-degree angle, the fixation thereof at such a specific angle should be made possible by providing a bush and the like in the hinge part 5.

In FIG. 1, the fixed display part 4 is included in the upper-side case 2, and an operating part 6 is included in the lower-side case 3. A reception part 7 is a speaker for playing back a received voice. A transmission part 8 is a microphone for picking up a voice of an operator of this portable information terminal. The reception part 7 and transmission parts 8 realize a basic function of performing input/output of a voice as a telephone.

An opening and closing detecting part 9 is for detecting opening and closing of the cases and is used for power control of the fixed display part 4 and the like.

A camera part 10 is a detachable camera module, which is an exterior part, and a lens 11 is a lens in the camera part 10 for photographing. By use of the above components, a still image or a motion image is photographed. The camera part 10 can improve a degree of freedom of the photographing by rotating 180 degrees or 360 degrees. However, this mechanism of the camera part 10 is not necessarily an essential one. Moreover, the camera part 10 may be detachable. Furthermore, in the constitution of this embodiment, the camera is an exterior part provided at the left side of the portable telephone when viewed from the front. However, the camera may be provided at the right side thereof or may be built in a body of the portable telephone 1 (or a body of the portable information terminal).

Figure 2:
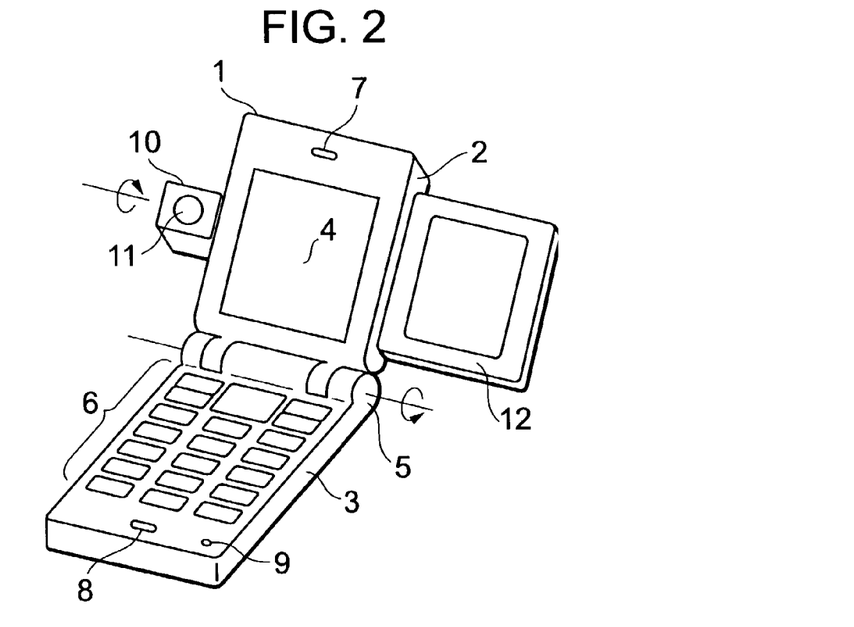
FIG. 2 is a perspective view of the folding portable information terminal when the case and the movable display part are both opened according to the present invention.

FIG. 2 is a front perspective view of the portable telephone 1 when a movable display part 12, which has been folded in a backside of the upper-side case 2, is opened to a front side of the upper-side case 2 after the state of FIG. 1.

Figure 3:
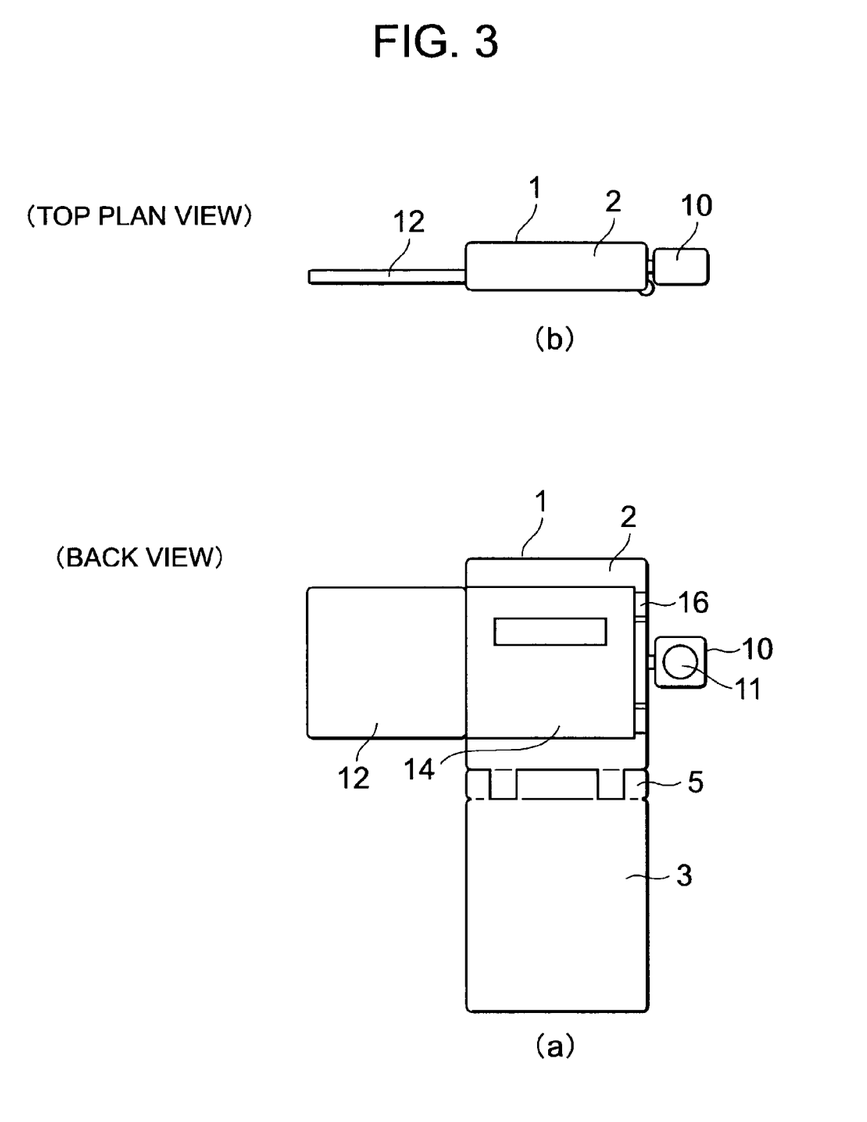
FIG. 3(a) is a back view of a folding portable telephone when a case thereof is opened, a movable display part is opened and a movable display part protection cover is closed.
FIG. 3(b) is a top plan view of the folding portable telephone when the case is opened, the movable display part is opened and the movable display part protection cover is closed.

FIG. 3(*a*) is a back view of the perspective view of FIG. 2, showing a state where a movable display part protection cover 14 to be described later is closed after the movable display part 12 is opened. FIG. 3(*b*) is a top plan view of FIG. 3(*a*).

Figure 4:
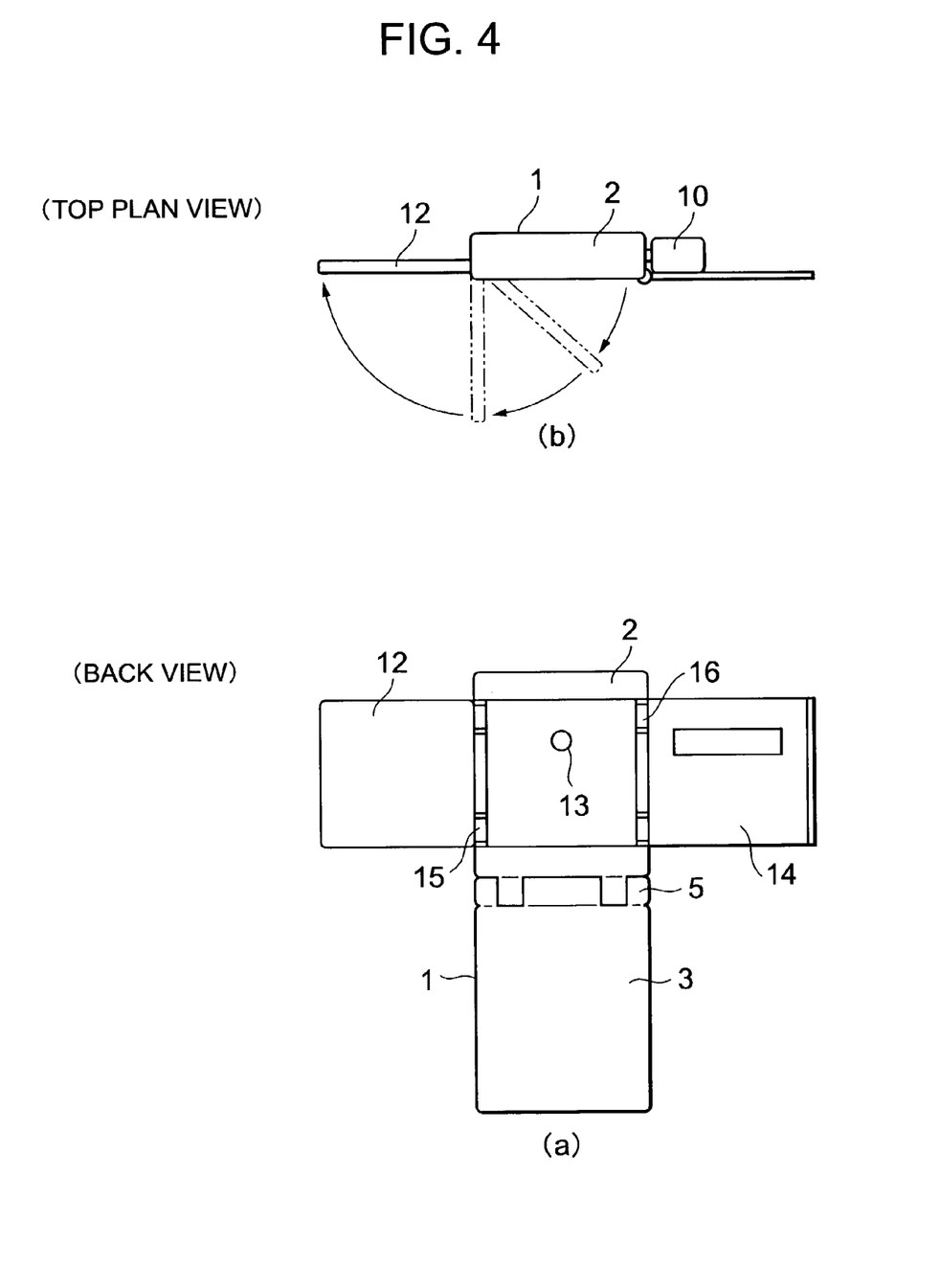
FIG. 4(a) is aback view of the folding portable telephone when the case, the movable display part and the movable display part protection cover are opened.
FIG. 4(b) is a top plan view of the folding portable telephone when the case, the movable display part and the movable display part protection cover are opened.

Moreover, FIG. 4(*a*) is a back view showing a state where the movable display part 12 and the movable display part protection cover 14 are both opened, and FIG. 4(*b*) is a top plan view of this state. Both FIGS. 3(*a*) and (*b*) and FIGS. 4(*a*) and (*b*) indicate that the movable display part 12 is opened in a direction reverse to that of the movable display part protection cover 14. Particularly, FIG. 4(*b*) shows a path of opening motion of the movable display part 12 and describes a state of the movable display part 12 opened taking a hinge for the movable display part (hereinafter referred to as a movable display part hinge) 15 as an axis.

The movable display part 12 is included in the upper-side case 2 and is opened taking the movable display part hinge 15 (FIG. 4), as an axis. The movable display part hinge 15 is provided on the back of the upper-side case 2. In this embodiment, the movable display part hinge 15 is provided at the left side of the upper-side case 2 when viewed from the back. However, disposition of the movable display part hinge 15 is not necessarily limited to this position. Moreover, in the upper-side case 2 or the movable display part 12, a movable display part opening and closing detecting part 13 is included. The movable display part opening and closing detecting part 13 detects opening and closing of the movable display part 12.

When the movable display part 12 is opened as described in FIG. 2, the movable display part opening and closing detecting part 13 (FIG. 4) detects an open state thereof, and whereby the movable display part 12 can start its display. When the movable display part 12 is opened as described above, an information amount received by the operator is increased since not only the fixed display part 4 but also the movable display part 12 is displayed. Meanwhile, power consumption can be reduced compared to the case of constant display.

Note that, when the user opens the case as described in FIG. 1, a control circuit to be described later of the portable telephone 1 determines, in response to a state of the opening and closing detecting part 9 (FIGS. 1 and 2), that the user has started using the portable telephone and turns on display of the fixed display part 4. In this event, it is determined that the user will not see a display screen of the movable display part 12 and thus the display of the movable display part 12 is turned off, whereby power consumption of a battery can be reduced. Moreover, when it is determined that the case of the portable telephone is in its closed state in response to the state of the case opening and closing detecting part 9, the display of the fixed display part 4 is turned off and thus a software operated in a standby state can be executed.

The portable telephone 1 of the embodiment of the present invention displays a received image by use of any one of the fixed display part 4 and the movable display part 12 and displays a transmitted image by use of the other thereof. Thus, oral communication by use of the portable telephone as a video telephone is possible while confirming the image transmitted from its own terminal in an actual dimension. Moreover, a particular effect is offered, such as focusing and checking whether or not the image contains inappropriate scenes to be photographed while confirming the transmitted image on a large screen. Furthermore, adoption of the foregoing configuration also brings a secondary effect, in which in using the portable telephone 1 as a network-compatible portable game machine, the user's own screen and a screen of his/her opponent can be continuously displayed.

Note that the movable display part 12 is opened at 180 degrees in FIG. 2. However, in order to show a video telephone screen to a third party, a bush and the like should be provided in the movable display part hinge 15 so that the movable display part 12 can be fixed at an angle such as 90 degrees or 120 degrees. Moreover, in order to provide a function of showing the video telephone screen to the third party, a control circuit 17 to be described later, which is provided inside of the portable telephone 1, should allow the fixed display part 4 and the movable display part 12 to display the same image.

Figure 5:
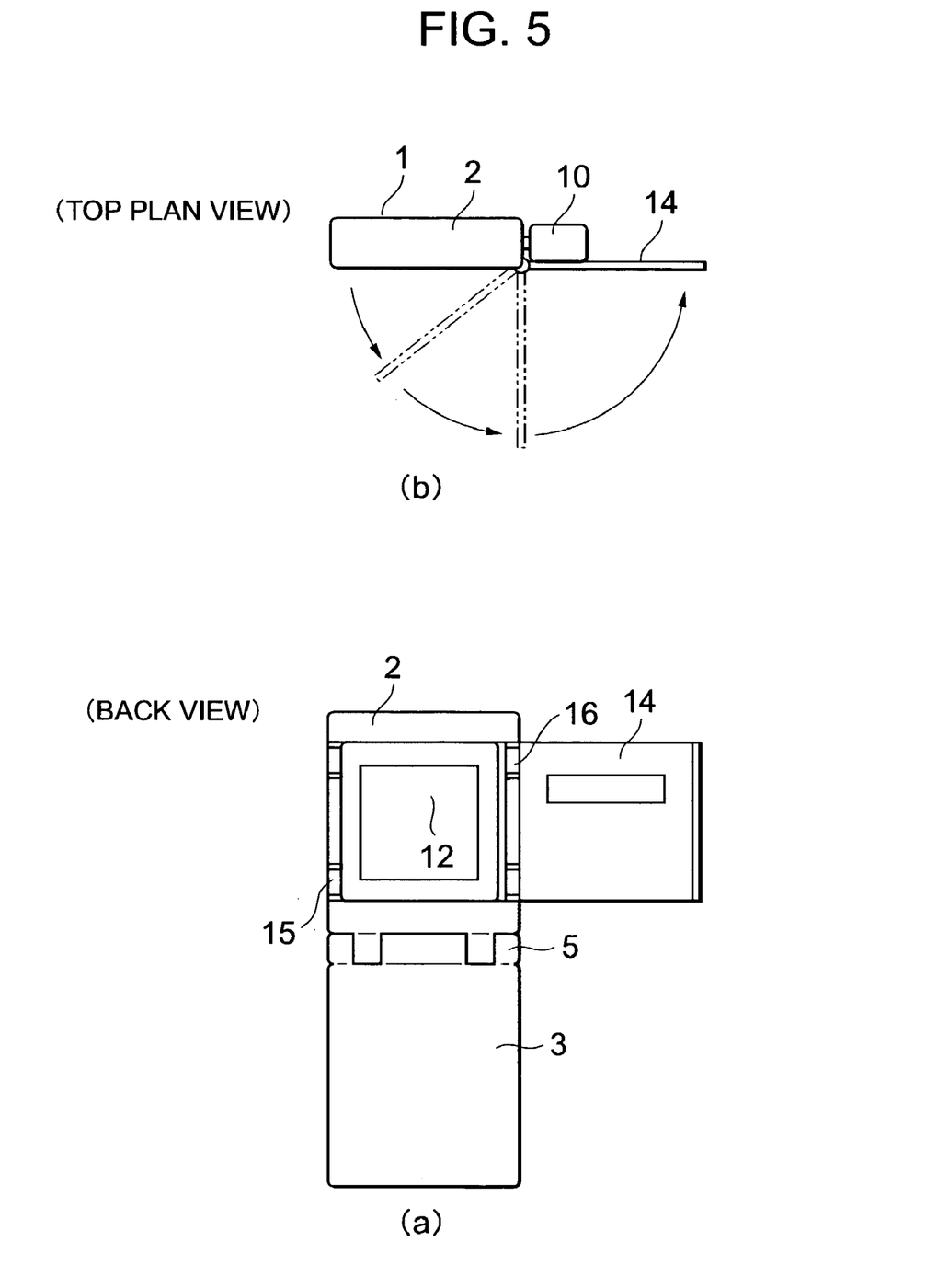
FIG. 5(a) is a back view of the folding portable telephone when the case is opened, the movable display part is closed and the movable display part protection cover is opened.
FIG. 5(b) is a top plan view of the folding portable telephone when the case is opened, the movable display part is closed and the movable display part protection cover is opened.

FIG. 5(*a*) is a back view of the portable telephone 1 when only the movable display part protection cover 14 is opened, and FIG. 5(*b*) is a top plan view thereof. In the top plan view, an order of operations of opening the movable display part protection cover 14 is described. Particularly, in FIG. 5(*b*), description is made for a path of opening the movable display part protection cover 14 and for a state where the movable display part protection cover 14 is opened using a protection cover hinge 16 as an axis.

Figure 6:
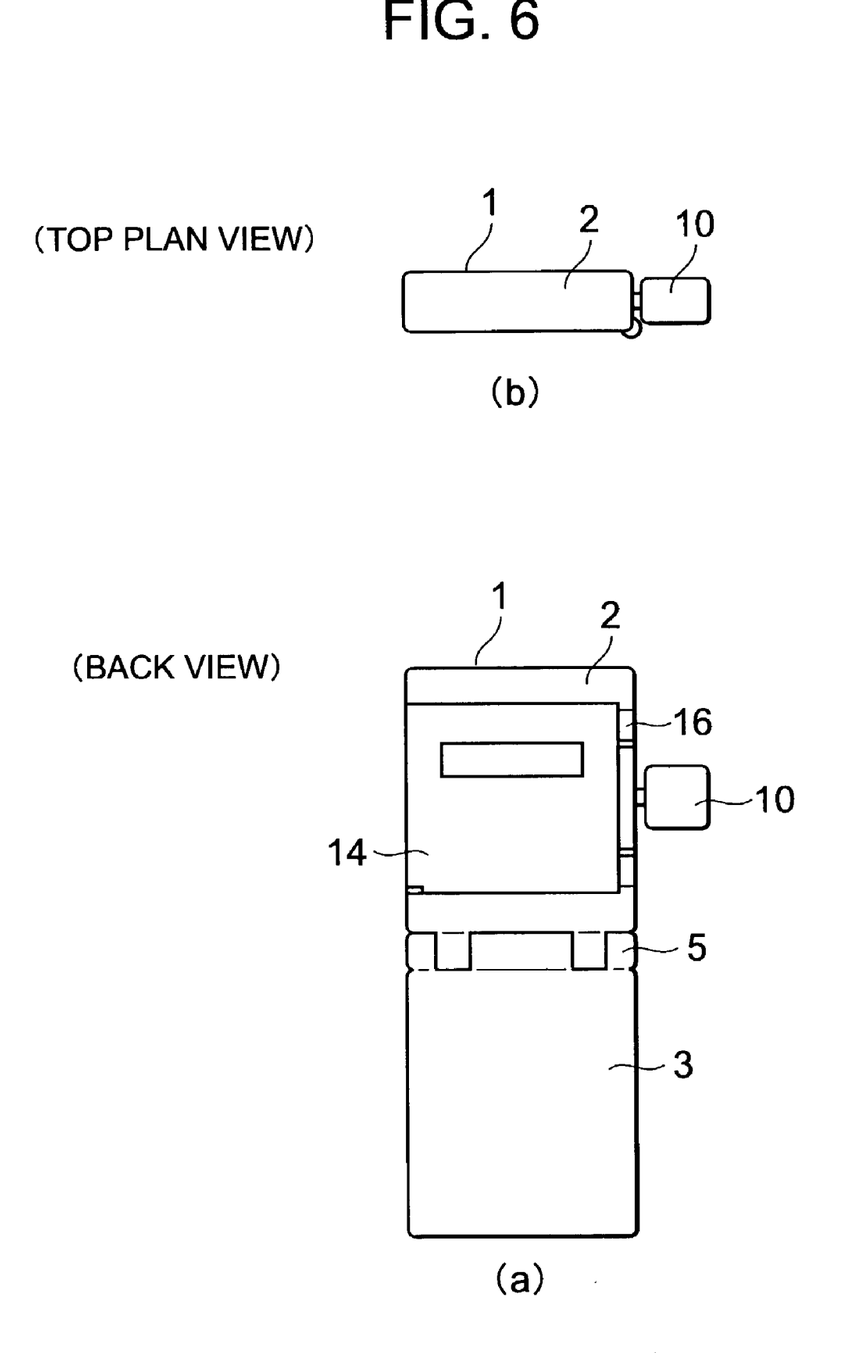
FIG. 6(a) is aback view of the folding portable telephone when the case is opened, the movable display part is closed and the movable display part protection cover is closed.
FIG. 6(b) is a top plan view of the folding portable telephone when the case is opened, the movable display part is closed and the movable display part protection cover is closed.

FIG. 6(*a*) is a back view of the portable telephone 1 when both of the movable display part 12 and the movable display part protection cover 14 are closed, and FIG. 6(*b*) is a top plan view thereof. The state shown in FIGS. 6(*a*) and (*b*) corresponds to the back view of FIG. 1.

As is clear from FIGS. 5(*a*) and (*b*) and FIGS. 6(*a*) and (*b*), in this embodiment, the movable display part 12 is housed in the upper-side case 2 when not used and is opened only in use thereof, thereby enabling the screen thereof to be displayed. Note that, when the movable display part 12 is closed, the display screen of the movable display part 12 is exposed to the outside at the backside of the portable telephone 1. Thus, as shown in FIGS. 6(*a*) and (*b*), the movable display part 12 is protected by the movable display part protection cover 14. Furthermore, this movable display part protection cover 14 can be transparent partially or entirely. In the foregoing case, even in the state where the cover is closed as shown in FIG. 6(*a*), by operating the movable display part 12 to make its display identifiable from outside, an operating state of the portable information terminal can be also informed to the user.

The movable display part protection cover 14 is for protecting the movable display part 12 from damage caused by falling and the like since when the movable display part 12 is housed in the upper-side case 2, its display screen is exposed to the outside. However, the movable display part protection cover 14 is not necessarily an essential constituent component in the present invention. In this embodiment, a transparent part is provided in a central portion of the movable display part protection cover 14 or the movable display part protection cover 14 may be entirely transparent. However, if the movable display part 12 does not need to be displayed when both of the movable display part 12 and the movable display part protection cover 14 are closed, the movable display part protection cover 14 does not need to be transparent.

As shown in FIGS. 3(*a*) and (*b*) and FIGS. 4(*a*) and (*b*), the protection cover hinge 16 for moving the movable display part protection cover 14 is positioned opposite to the movable display part hinge 15 in order to avoid interference of motions of the movable display part 12 and the movable display part protection cover 14. However, the position of the protection cover hinge 16 is not necessarily limited to the above. Note that, when providing the movable display part protection cover 14 in order to avoid interference with the camera 10, the movable display part protection cover 14 should be set as closable after the movable display part 12 is opened.

In FIGS. 4(*a*) and (*b*), the movable display part protection cover 14 is opened at an angle of about 180 degrees without interfering with the camera 10. However, it is satisfactory that the movable display part protection cover 14 does not interfere with the opening of the movable display part 12. Thus, the angle at which the movable display part protection cover 14 is opened does not need to be as large as 180 degrees.

The position of the movable display part opening and closing detecting unit 13 is not necessarily limited to the one shown in FIG. 4(*a*) as long as it can detect the opening and closing of the movable display part 12. The movable display part 12 may be turned off, when the movable display part 12 is closed and the movable display part opening and closing detecting unit 13 is thrust down. In this embodiment, in order to prevent the movable display part 12 from interfering with the camera 10, the movable display part 12 is set so as to be opened to the right side when viewed from the front.

Therefore, the movable display part hinge 15 of the movable display part protection cover 14 is always placed at the camera side. In this embodiment, the protection cover hinge 16 is provided at the left side when viewed from the front, that is, at the right side when viewed from the back.

However, as described above, the positions of the above constituent components are not particularly limited to the above. Note that the interference with the camera part 10 causes difficulties in photographing and displaying on the movable display part 12. Thus, consideration must be made therefor. Usually, when the case is folded, the movable display part 12 and the movable display part protection cover 14 seem to be housed in the above manner. However, as described above, when the movable display part 12 performs display when housed, the movable display part protection cover 14 needs to be transparent partially or entirely.

Figure 7:
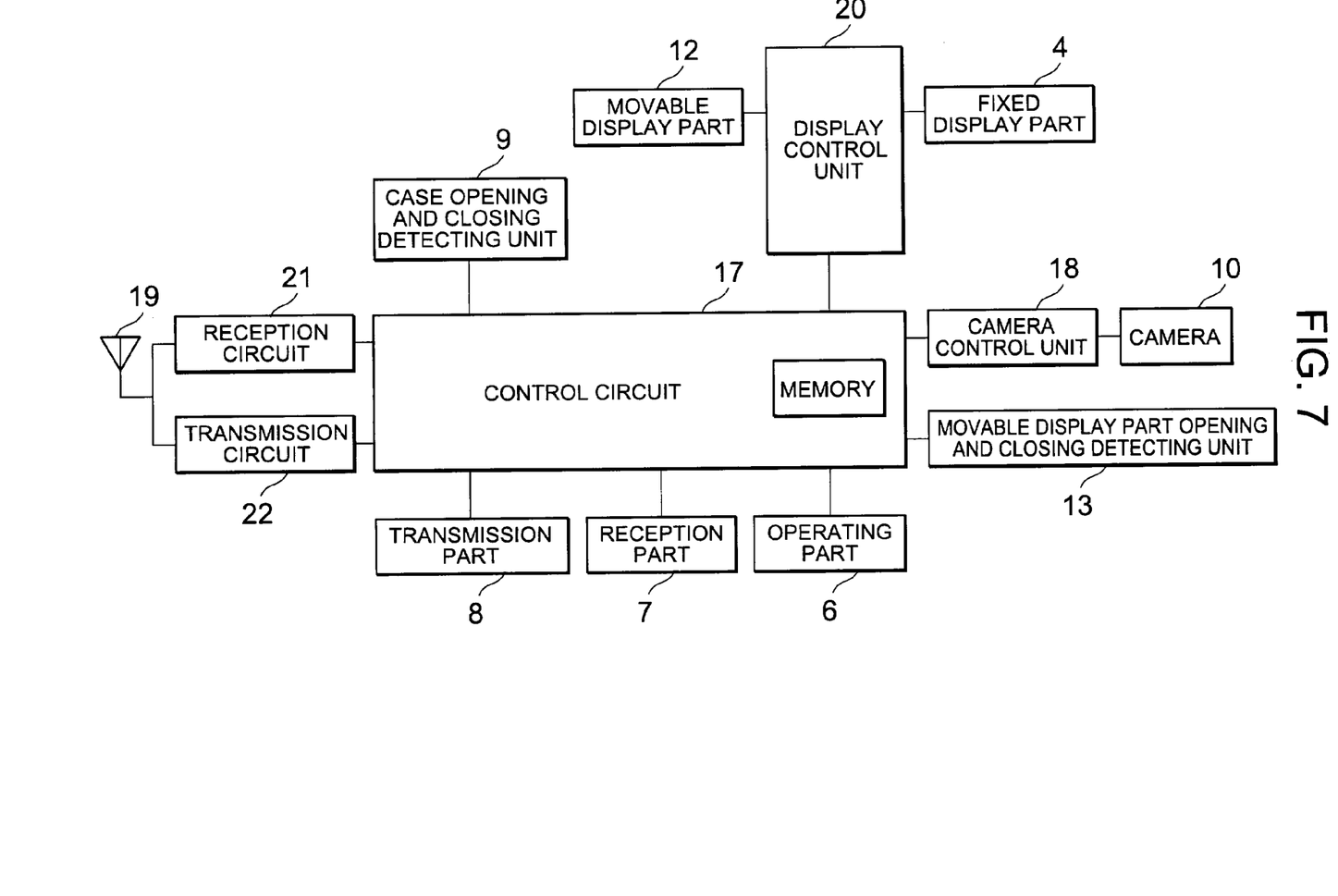
FIG. 7 is a block diagram showing a constitution of an electronic circuit of a portable information terminal of an embodiment of the present invention.

FIG. 7 is a block diagram showing an electrical constitution of this embodiment.

The operating part 6 controls an interface of operations such as input of a telephone number of the user and focus adjustment of the camera. When the user enters an input in the operating part 6, an interrupting signal is sent from the operating part 6 to a control circuit 17. Thus, a result of the input is reflected on the operation of the portable telephone.

The reception part 7 and transmission part 8 correspond to functions of a voice call. An analog audio captured by the transmission part 8 is digitalized by an analog-digital conversion circuit in the control circuit 17, and via a modulation circuit in a transmission circuit 22 and an antenna 19, an radio wave are transmitted to a base station (not shown).

On the other hand, the radio wave received by the antenna 19 is demodulated by a reception circuit 21 and is analogized via the digital-analog conversion circuit in the control circuit 17. Thereafter, the analogized electric audio is outputted from the reception part 8.

The case opening and closing detecting unit 9 is a mechanism for detecting the opening and closing of the upper-side case 2 and lower-side case 3 of the folding portable information terminal taking the hinge part 5 as its center. As the case opening and closing detecting unit 9, a switch and the like is usually used. However, a magnetic sensor such as a hall element, a reed relay and the like can be also used. There is a well-known technology which reduces a power consumption by detecting the opening and closing of the case and shutting down the power of the display part when the case is closed. The case opening and closing detecting unit 9 relates to this well-known technology. Note that, in a so-called straight portable telephone, which is not folded, the opening and closing of the case can never occur. Thus, the detecting unit of the present invention is unnecessary.

The movable display part opening and closing detecting unit 13 is a mechanism for detecting the opening and closing of the movable display part 12. Similar to the case opening and closing detecting unit 9, a switch, a magnetic sensor, a reed relay and the like can be used therefor. The movable display part opening and closing detecting unit 13 is used in performing control of not only saving power consumption by performing display control of the movable display part similarly to the case opening and closing detecting unit 9 but also displaying both a transmitted image and a received image on both the fixed display part 4 and the movable display part 12 when the video telephone function is used in the opened state.

In the control circuit 17, included are: a CPU; a bus controller for performing internal processing; an interrupting controller; a timer; analog-digital and digital-analog conversion circuits for voice data; a BlueTooth module; and a wireless LAN module.

A camera control unit 18 takes a role of transmitting control and image data of the camera 10 to the control circuit 17. The camera control unit 18 photographs in accordance with a photographing request sent via the operating part 6 and the control circuit 17, and transmits photographed data to the control circuit 17. If an image photographed by the camera part 10 can be compressed, time occupied by a data bus in the control circuit 17 is shortened. Thus, regardless of a processing state of the control circuit 17, it is desirable that the camera control unit 18 performs data compression. Moreover, the camera control unit 18 may be built in the control circuit 17.

The antenna 19 is used to transmit and receive a signal. There are various types of transmittion/reception systems with the antenna 19; however, the present invention does not particularly stipulate the system.

A display control unit 20 is for controlling display states of the fixed display part 4 and the movable display part 12 and performs switching among expansion of the received image of the video telephone, which is sent from the control circuit 17, display of the transmitted image and the like.

The reception circuit 21 is a demodulation circuit of received data, and the transmission circuit 22 is a modulation circuit of audio data to be transmitted after analog-digital conversion. In this diagram, the reception and transmission circuits are separated from the control circuit 17. However, these circuits can be integrated with the control circuit 17. Moreover, a plurality of demodulation circuits are included in a CDMA portable information terminal. However, description in this diagram includes one demodulation circuit.

A memory 23 is included in the control circuit 17 and refers to various memories such as a ROM, a DRAM and the like. An operating area for screen expansion is also included in the memory.

Figure 8:
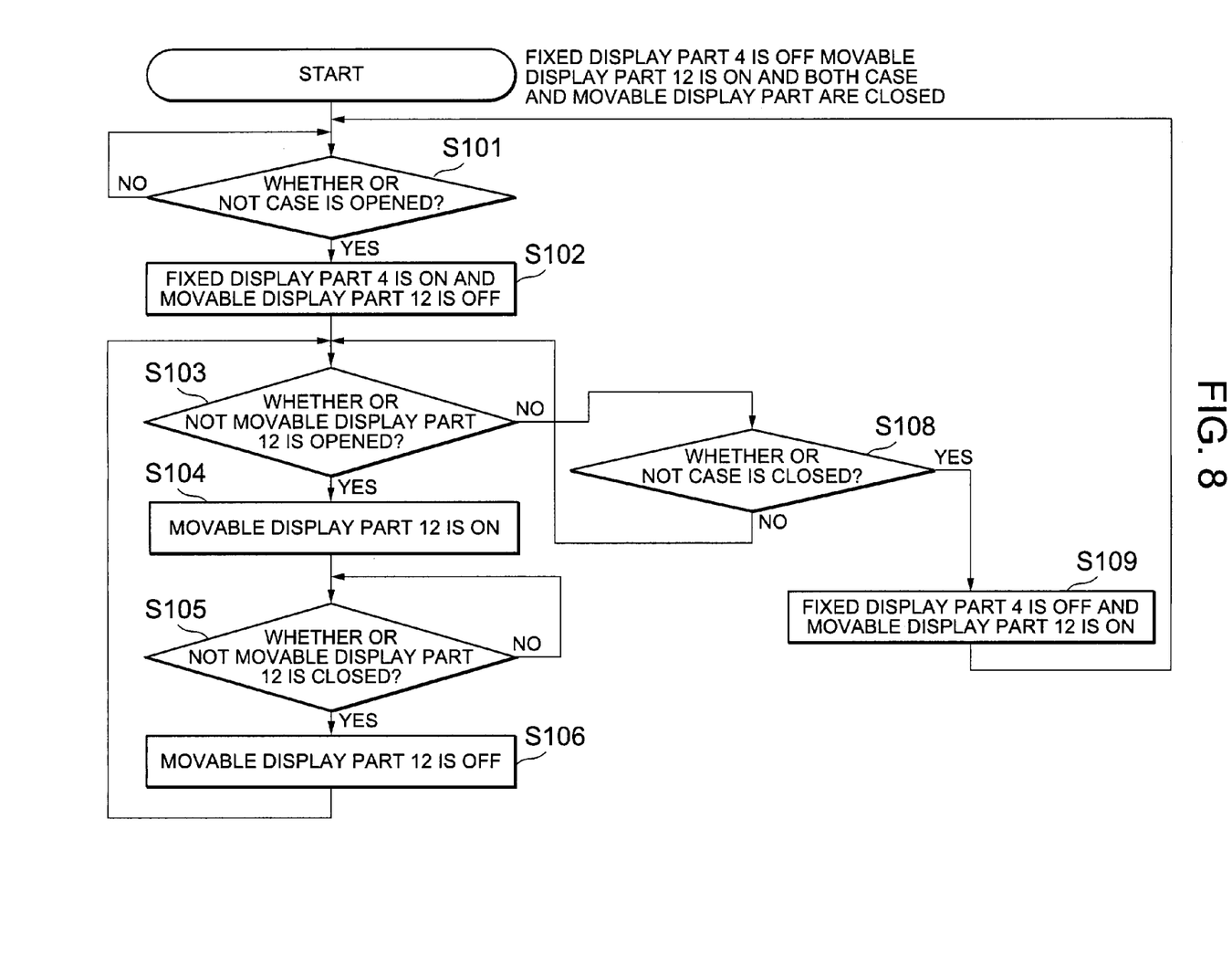
FIG. 8 is a flowchart showing an example of screen control by opening and closing of a case and a movable display part of the portable information terminal of the embodiment of the present invention.

FIG. 8 is an example of a flowchart related to power control by On/Off control of the fixed display part 4 and the movable display part 12 in the folding portable information terminal including both the case opening and closing detecting unit 9 and the movable display part opening and closing detecting unit 13, in which the movable display part 12 is opened as described in FIGS. 3 to 6. Usually, when the folding portable information terminal is in the standby state, a power supply to the fixed display part 4 is stopped and only the movable display part 12 is displayed. When the opening of the case is detected by the case opening and closing detecting unit 9 (S101), the control circuit 17 sends an instruction to the display control unit 20 and the control of the display control unit 20 allows the fixed display part 4 to operate. Thus, in turn, a power supply to the movable display part 12 is stopped (S102). When the movable display part 12 is further opened in this state (S103), the movable display part opening and closing detecting unit 13 detects the opening of the movable display part 12. Thus, the movable display part 12 is also displayed simultaneously with the fixed display part 4. Along with the operation of the movable display part opening and closing detecting unit 13, the power supply to the movable display part 12 is started via the display control unit 20 by the control circuit 17, and thus the movable display part 12 is displayed (S104). In this event, the control circuit 17 can change display contents depending on whether the video telephone is used or not.

When the movable display part 12 is closed (S105), the control circuit 17 turns off the display of the movable display part 12 again (S106). When the case is closed (S108), power consumption can be reduced by turning on the display of the movable display part 12 and turning off the display of the fixed display part 4.

Note that the power control is not always necessary. It is exemplified herein that there is such a method of the power control. It is also possible to change the object to be displayed during the above-described switching and to change a display mode depending on whether the user is making a phone call or reading a mail.

Figure 9:
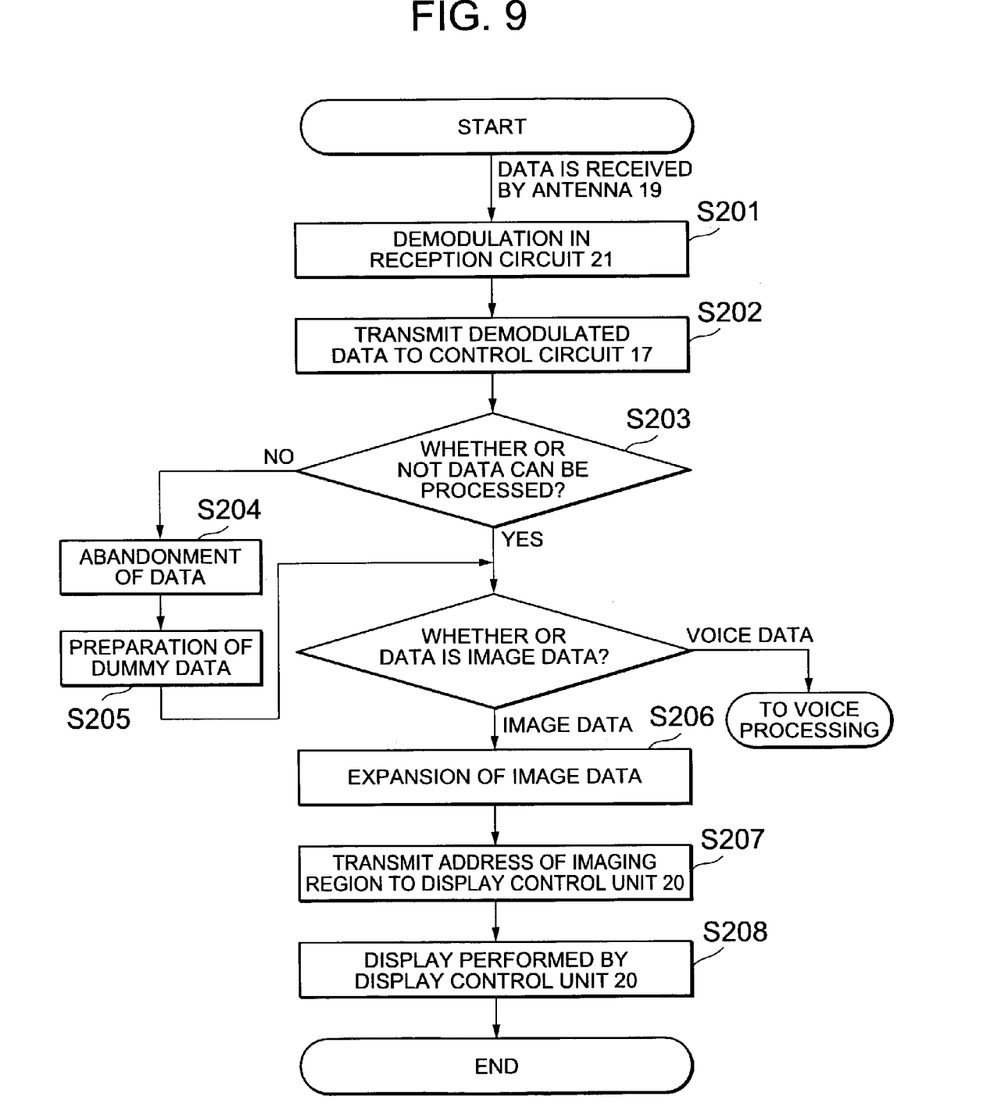
FIG. 9 is a flowchart showing an example of screen display of the portable information terminal of the embodiment of the present invention when image data is received.

As to transmission/reception of an image received in the use of the video telephone and a display operation thereof, description will be made with reference to FIGS. 7 and 9.

Image data of a video telephone, which sent from a call destination and is inputted from the antenna 19, is inputted to the control circuit 17 via the reception circuit 21 (S201). The reception circuit 21 performs demodulation processing of received analog data and thereafter inputs the demodulated data to the control circuit (S202). The control circuit 17 determines whether or not the inputted data can be processed as an image or an audio (S203 and S205). According to the determination result, if the data can not be processed, the data is abandoned (S204). Then, the control circuit 17 itself performs processing such as preparation of a dummy image (S205).

The image data inputted to the control circuit 17 is expanded by utilizing the memory 23 as a work area in such a manner that the image data can be displayed (S206). After the expansion is finished, the control circuit 17 sends an address to the display control unit 20, the address indicating a storage region of the expanded image data (S207). Then, under a condition determined in presetting, the display control unit 20 displays the image in one of or both of the fixed display part 4 and the movable display part 12 (S208). Note that means for sending the address indicating the storage region of the image data from the control circuit 17 to the display control unit 20 is not limited to the above. A method of sending the data itself after the expansion is also conceivable.

When the portable telephone is used as the video telephone, a case is conceivable where the control circuit 17 performs processing of both an image received from the call destination and an image transmitted thereto. When the transmitted image photographed by the camera 10 is displayed on the fixed display part 4 or the movable display part 12 simultaneously with the received image, the operator can perform operation while confirming his/her own photographing screen. Furthermore, when the image received from the call destination is displayed on both the fixed display part 4 and the movable display part 12 that is set so as to be seen from a direction different from the fixed display part 4, it is possible for a number of people to display and check the image sent from the call destination by use of single portable telephone.

Figure 10:
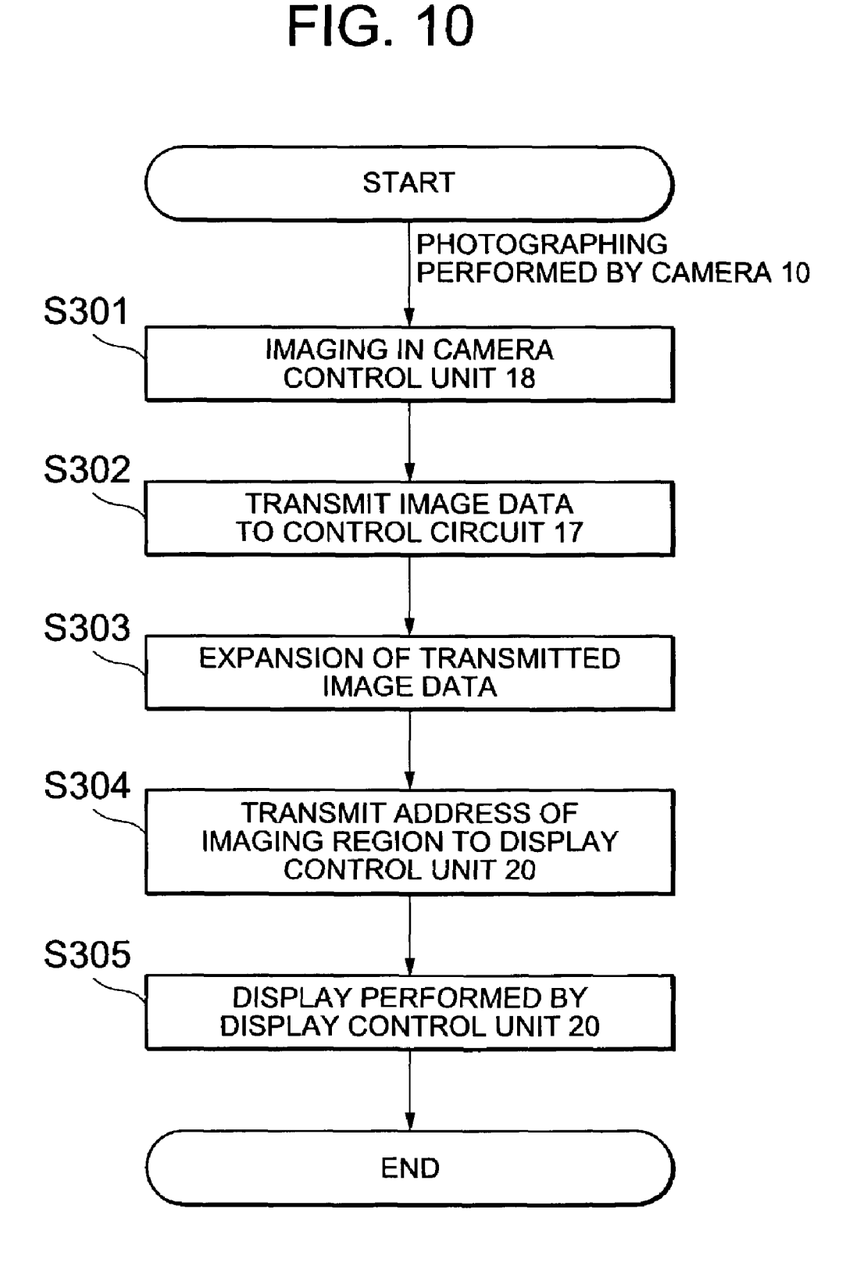
FIG. 10 is a flowchart showing expansion processing of image data to a screen, the image data being photographed by a camera of the portable information terminal of the embodiment of the present invention.

Description will be made for an operation of displaying a photographed image on the display part with reference to FIGS. 7 and 10.

After the control circuit 17 converts the image data to be transmitted, which is inputted from the camera 10, into a format that can be processed by use of the camera control unit 18 (S301), the camera control unit 18 sends the image data after the conversion to the control circuit 17 (S302). In this event, since the image data is guaranteed by the camera control unit 18, the control circuit 17 does not need to determine the readability of the image data unlike the data input from the antenna.

There is no limitation placed upon whether or not the image data sent from the camera control unit 18 is compressed. The control circuit 17 expands the image data in an expansion region after securing any region of the memory 23 as the expansion region (S303). After the expansion performed by the control circuit 17, the control circuit 17 sends an address of a imaging region to the display control unit 20 (S304). The display control unit 20 displays the image data on any one of or both of the fixed display part 4 and the movable display part 12 (S305).

When the portable telephone is used as the video telephone, if the screen of the image photographed by the camera 10 is set not to be displayed, the control circuit 17 does not send the address and the like to the display control unit 20 (S303 to S305 are not executed).

Moreover, it is necessary to send the image data photographed by the camera 10 to the call destination. Processing thereof will be described with reference to FIGS. 7 and 11. Note that the processing up to the control circuit 17 is similar to the one described in FIG. 10. Thus, description thereof will be omitted.

Figure 11:
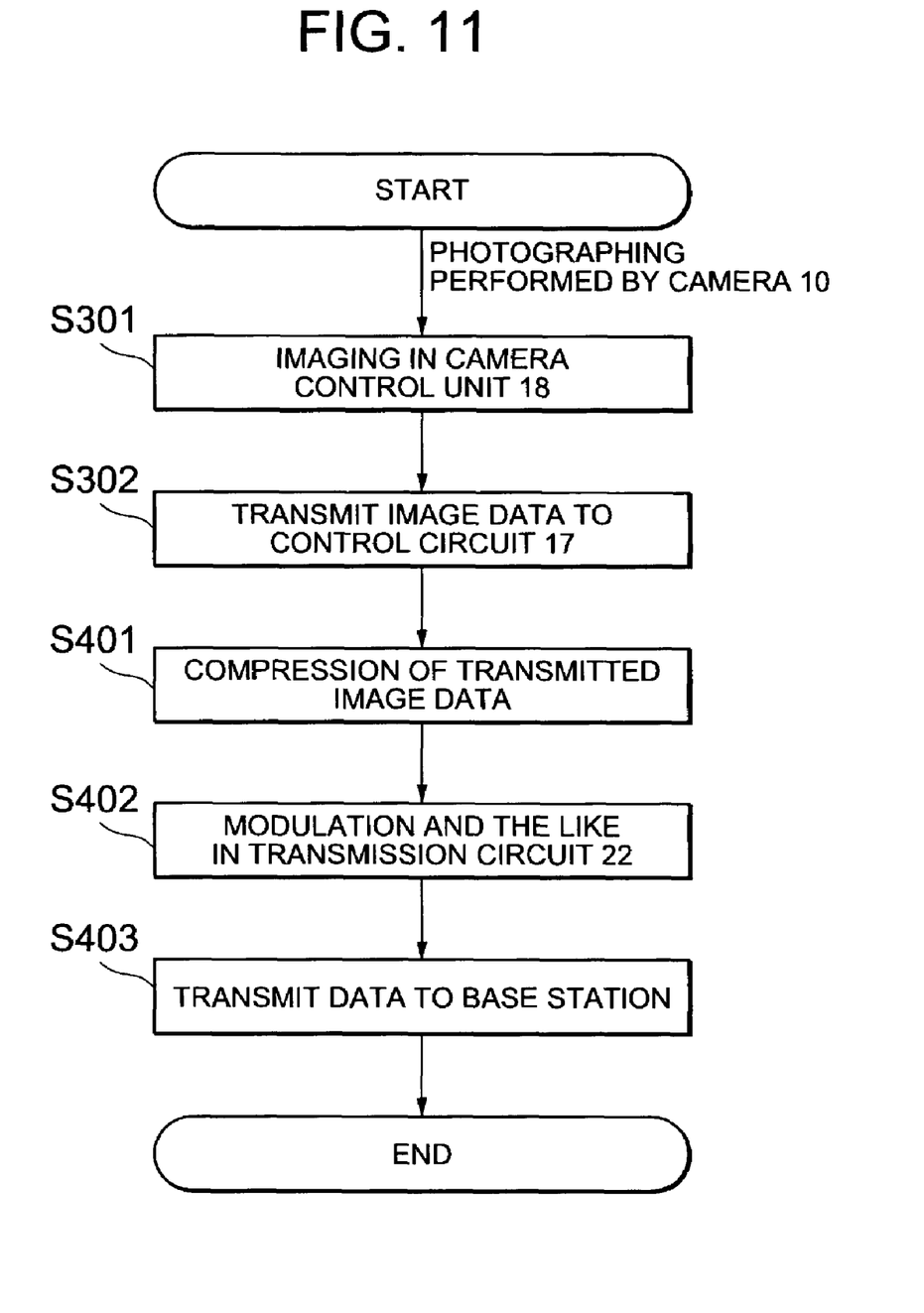
FIG. 11 is a flowchart showing transmission processing of the image data, the image data being photographed by a camera of the portable information terminal of the embodiment of the present invention.

If the image data sent to the control circuit 17 is not compressed data, the control circuit 17 compresses the received image data for transmission (S401). This data compression is for reducing an amount of data to be transmitted. Note that, if the data sent from the camera control unit 18 is compressed data, this step of compressing data can be omitted.

Thereafter, the data after the compression is sent to the transmission circuit 22 and modulation processing is performed (S402). Then, the modulated data is sent to the base station via the antenna 19, thereby completing the transmission processing of the image (S403). Specific processing of the data transmission is well known among those skilled in the art and is not directly related to the present invention. Thus, the description thereof will be omitted.

Moreover, transmission/reception of the audio data is well known among those skilled in the art and is not directly related to the present invention. Thus, detailed description of its constitution and operation will be omitted.

In the embodiment, the folding portable telephone is assumed as the portable information terminal. However, the portable information terminal is not limited thereto. Although it is not customized, if a movable display part in a lid form can be attached to the so-called straight portable telephone, a similar effect is obtained. The portable information terminal may be a slide portable telephone.

Adoption of the foregoing constitution brings about the following effects.

A first effect is to increase an information amount of a displayed image by expanding a display part on the back of the case and enabling the display part to be used when the portable information terminal is in normal use.

A second effect is to enable a call of a video telephone while looking at an image received from a call destination, confirming a transmitted image and confirming focus adjustment and an inappropriate image to be received.

A third effect is to enable effective use of a display part on the back of the case, which is not conventionally used during a call, by opening the back of the case, when the video telephone is in use.

What is claimed is:

1. A portable information terminal comprising:
   a fixed display part;
   a movable display part in a shape of a lid body that can be opened from a back of a case;
   a transmission and reception circuit which transmits and receives data including image data for a telephone conference;
   a camera which photographs an image and which is rotatably mounted on the fixed display part of said portable information terminal;
   a control unit which controls, during the telephone conference, the fixed display part and the moveable display part to display a received image and a transmitting image on any one of the fixed display part and the moveable display part; and
   a protection cover, which is entirely or partially transparent and which protects the movable display part, wherein in a state where the movable display part is protected by the protection cover, the entire or part of the display screen of the movable display displays the received image,
   wherein the camera is rotatable in a range of 360 degrees,
   wherein the camera is capable of photographing the image throughout the range of 360 degrees, and
   wherein the image photographed by the camera corresponds to the transmitting image.

2. The portable information terminal of claim 1, further comprising a movable display part opening and closing detecting unit which detects opened and closed states of the movable display part.

3. The portable information terminal of claim 2, wherein the movable display part stops its display operation when the movable display part opening and closing detecting unit detects the closed state of the movable display part.

4. The portable information terminal of claim 1, further comprising a protection cover of the movable display part, wherein the protection cover protects a display screen of the movable display part when the movable display part is closed.

5. The portable information terminal of claim 1, further comprising a mechanism which supports the movable display part after being opened from the back of the case such that a display screen of the movable display part is positioned at an angle which is capable of being viewed from a given direction.

6. The portable information terminal of claim 1, wherein the camera is rotatably mounted on the side of the portable information terminal.

7. The portable information terminal of claim 1, wherein the camera is detachable from the portable information terminal.

8. A portable information terminal comprising:
   a fixed display part;
   a movable display part in a shape of a lid body that can be opened from a back of a case;
   a protection cover, which is entirely or partially transparent and which protects the movable display part;
   a transmission and reception circuit which transmits and receives data including image data for a telephone conference;
   a camera which photographs an image and which is rotatably mounted on the fixed display part of said portable information terminal;
   a control unit which controls, during the telephone conference, the fixed display part and the moveable display part to display a received image and a transmitting image on any one of the fixed display part and the moveable display part,
   wherein the camera is rotatable in a range of 360 degrees,
   wherein the camera is capable of photographing the image throughout the range of 360 degrees, and
   wherein the image photographed by the camera corresponds to the transmitting image.

* * * * *